Patented Aug. 4, 1936

2,049,988

UNITED STATES PATENT OFFICE 2,049,988

PROCESS FOR OBTAINING VITAMINS

Robert R. Williams, Roselle, and Robert E. Waterman, Orange, N. J., assignors to Research Corporation, New York, N. Y., a corporation of New York No Drawing. Application September 27, 1932, Serial No. 635,050

18 Claims. (Cl. 167—81)

This invention relates to water soluble vitamins and particularly to the so-called antineuritic vitamin.

The principal object of the invention is to provide means for obtaining a good yield of water soluble vitamins and particularly the antineuritic vitamin in highly concentrated form from materials of natural origin.

The principal feature of the invention is the elution of a vitamin from fuller's earth upon which the vitamin has been adsorbed from an extract of yeast, bran or other natural source.

Seidell, U. S. Patent 1,173,317, Feb. 29, 1916, has disclosed that the antineuritic vitamin is removed from such extracts by adsorption upon fuller's earth. It is well recognized that many acid clays have the same property in greater or less degree. Other workers have offered modifications of Seidell's original method consisting in the control of the ratio of fuller's earth to extract, the acidity of the extract and the time and conditions of contact with the extract. It has also become known that certain other nitrogenous substances accompanying the antineuritic vitamin are also adsorbed upon the fuller's earth. Some of these substances are of some physiological importance and may be of the nature of vitamins. Many workers have also applied measures to remove the vitamin again from the fuller's earth, consisting of treatment of the activated fuller's earth with aqueous solutions of ammonia, or sodium or potassium or barium hydroxides. Applicants have also found that digestion with hydrofluoric acid or with a mixture of hydrochloric and hydrofluoric acids removes the vitamin to a great extent from the fuller's earth.

None of these methods is wholly satisfactory, because the reagents used destroy part of the vitamin in the process or leave a considerable fraction of the vitamin remaining in the fuller's earth or both so that not much more than half the total vitamin present can be recovered again in soluble form. This makes it impracticable to use fuller's earth repeatedly as an adsorbent as the losses in each process of elution offset the concentration of physiological activity which might otherwise be obtained. Since the number of known adsorbents or precipitants for the vitamin is small and since none of them is highly specific in its action it is important that full use should be made of each one as for example by readsorption or reprecipitation for purposes of purification of the vitamin.

According to this invention the vitamin is removed from fuller's earth or similar adsorbent by extraction with an excess of an aqueous solution of a substance which is strongly adsorbed upon the fuller's earth. The solution is preferably used in an acid condition to avoid destruction of the vitamin by heat or alkalinity and is best used at a temperature of 80° C. to 100° C. to promote complete extraction. The fuller's earth is preferably stirred for several minutes with the hot solution which is then removed while hot by decantation, centrifugation or filtration. The extraction is preferably repeated several times and the extracts combined for further use.

The action is presumably analogous to that of the permutite filter whereby hard waters are softened by adsorption of the alkaline earths upon a filtering medium consisting of an artificial zeolite. When the zeolite has approached saturation with alkaline earths it is renewed by passing through it a strong solution of sodium chloride whereby the sodium displaces the calcium in large part from combination with the zeolite.

It is important in extracting the vitamin from fuller's earth that a substance be chosen to displace the vitamin which is readily separated subsequently from the vitamin solution by chemical means as an excess of this reagent will be found to be present in solution in the extract containing the vitamin. We have tried many reagents. Solutions of salts of aniline or other monamino bases are not very effective in displacing the vitamin. Diamino compounds, especially strongly basic ones, are serviceable. Caffeine salts are fairly effective and may be used. We prefer however salts of strongly basic alkaloids of considerable molecular weight such as strychnine, quinine or brucine as they displace the vitamin more completely and are subsequently separated from the vitamin without serious difficulty. As a class the basic dyes are useful reagents for this purpose, since they are produced commercially and synthetically and are therefore available at more moderate cost than the alkaloids. Bismarck brown has been found nearly if not quite as good as quinine and is cheaper. Other nitrogenous bases such as the guanidines may be used. Diphenyl guanidine has been tried but is not to be preferred on account of its toxicity to experimental animals. Certain other polyamino bases, although effective in removing the vitamin from fuller's earth, are unsatisfactory from a practical or commercial standpoint because they decompose too readily or present difficulties in freeing the extracts of the excess of the reagents.

Whatever the base chosen, it should be used in the form of an acid solution, e. g. pH 1.0 to 4.0. The sulphates are convenient in most cases. In many cases the excess of the bases can be precipitated by neutralizing the extract with a suitable base such as sodium or barium hydroxide.

After removal of the alkaloid the solution may be purified in various known ways. Impurities may be removed by treatment with an acyl aromatic chloride or an aromatic sulphochloride in the presence of an excess of sodium bicarbonate. Or the solution may be purified by precipitating with lead acetate solution leaving the vitamin in the filtrate. Or a measure of purification may be effected by precipitating with a soluble silver salt at pH 5.0, thereby removing purine bases and leaving the vitamin in solution. Or the solution may be precipitated with phosphotungstic or silico-tungstic acid and the resulting precipitate which contains the vitamin may be brought into solution in 75 per cent acetone. Or these methods may be used in suitable succession.

However, whatever the means of purification, the vitamin may again be separated at any desired stage from the solution whether purely aqueous or partly acetonic by readsorption upon fuller's earth and with each successive step of purification the quantity of fuller's earth required to absorb the vitamin completely or nearly completely is greatly reduced, especially in the earlier steps. The vitamin may again be removed from the fuller's earth by extraction with an acid solution of an alkaloidal salt and purified further. At each adsorption some of the natural impurities are left behind in solution along with the residues of reagents used in previous purification steps. Some of these reagents are liable to interfere with the subsequent use of other reagents.

The following specific example will make clear the preferred procedure. One hundred kilos of rice polish are extracted exhaustively at room temperature with 20 parts of alcohol and 80 parts of water to which is added enough sulphuric acid to make the final extract of pH 4.5 approximately. This quantity of acid is determined by trial with small portions of polish.

The extract of 100 kilos of rice polish is stirred continuously for 10 hours with 3 kilos of English fuller's earth (Surrey) and the fuller's earth is separated by decantation after settling for 12 hours, from the bulk of the extract. The fuller's earth is collected on a filter, the remaining liquid is drained off and the fuller's earth is washed three times with 10 liters of water each time. Upon test it will be found that 20 to 50 mgs. of this earth are required daily to prevent polyneuritis in a rat or pigeon.

The washed fuller's earth is now suspended in 15 liters of boiling water containing 50 grams of quinine bisulphate per liter and sufficient excess sulfuric acid to turn Congo red indicator. It is boiled therewith with vigorous stirring for 15 minutes and the liquid is filtered off while hot. The fuller's earth is now stirred in 10 liters of fresh hot acid quinine bisulphate solution as before and after 15 minutes is again filtered off. A third extraction is made in the same way with 5 liters of additional acid quinine bisulphate solution. If desired the fuller's earth may be extracted a fourth time with 5 liters of solution but this is usually unnecessary.

The combined extracts of the fuller's earth are now cooled and neutralized with saturated barium hydroxide solution adding the barium hydroxide gradually and with constant stirring. The bulk of the quinine is thereby removed as sulphate mixed with approximately equimolecular proportions of barium sulphate. After standing for 10 hours or more this precipitate is filtered off and from it the quinine sulphate may be recovered by well-known means.

The filtrate from this mixed precipitate is now brought to pH 6 by addition of dilute sulphuric acid and concentrated by evaporation at not over 40° C. to a volume of 10 liters and a further quantity of quinine is removed as sulphate by addition of barium hydroxide as before. This precipitate is filtered off, extracted with dilute sulphuric acid and filtered. The filtered extract is treated with barium hydroxide as before to re-precipitate the quinine and filtered. This filtrate from the re-precipitated quinine is added to the main filtrate.

An alternative procedure is to extract the above mentioned activated fuller's earth with an acid solution of Bismarck brown in a similar manner. The solution to be used for extraction should contain 75 grams of Bismarck brown per liter, should be acidulated to Congo red with hydrochloric or sulphuric acid and used in the same proportions as the acid quinine bisulfate solution above described. The excess of Bismarck brown is precipitated from the extract by neutralizing with an inorganic base.

In either case the resulting vitamin solution may be concentrated by evaporation in vacuo to a small volume or subjected to further purification processes.

The invention claimed is:

1. A process of obtaining concentrated water soluble vitamins from natural sources comprising adsorption of such a vitamin upon fuller's earth and treatment of the fuller's earth with an acid solution of a salt of a polyacid nitrogenous base which displaces the vitamin from the fuller's earth.

2. A process of obtaining concentrated antineuritic vitamin from natural sources comprising adsorption of the vitamin upon fuller's earth and treatment of the fuller's earth with an acid solution of a polynitrogenous alkaloidal salt.

3. The process of obtaining concentrated water soluble vitamins from natural sources, which comprises adsorbing such a vitamin upon a strongly adsorbent powdered mineral, and then treating the mineral with an acid solution of a strong organic polynitrogenous base which is readily adsorbed by the mineral and which displaces the vitamin from the mineral.

4. The process of obtaining concentrated water soluble vitamins from natural sources, which comprises adsorbing such a vitamin upon a strongly adsorbent acid clay, and then treating the clay with an acid solution of a salt of a poly amino compound capable of removing the vitamin from the clay.

5. The process of obtaining concentrated antineuritic vitamin from natural sources, which comprises adsorbing the vitamin upon fuller's earth, and then treating the fuller's earth with an acid solution of a salt of a strong organic polynitrogenous base of high molecular weight capable of displacing the vitamin from the fuller's earth.

6. The process of obtaining concentrated antineutric vitamin from natural sources, which comprises adsorbing the vitamin upon fuller's earth, and then treating the fuller's earth with an acid solution of a compound from the group consisting of Bismarck brown and salts of caffeine, strychnine, quinine, brucine, guanidine and diphenyl guanidine.

7. The process of obtaining concentrated antineuritic vitamin from natural sources, which comprises adsorbing the vitamin upon fuller's earth, and then treating the fuller's earth with an acid solution of a strongly basic alkaloidal salt of high molecular weight.

8. The process of obtaining concentrated antineuritic vitamin from natural sources, which comprises adsorbing the vitamin upon fuller's earth, and then treating the fuller's earth with an acid solution of a basic dye.

9. The process of obtaining concentrated antineuritic vitamin from natural sources, which comprises adsorbing the vitamin upon fuller's earth, and then treating the fuller's earth with an acid solution of a salt of a guanidine.

10. The process of obtaining concentrated antineuritic vitamin from natural sources, which comprises adsorbing the vitamin upon fuller's earth, and then treating the fuller's earth with an acid solution containing an excess of a salt of an organic polynitrogenous base which has a basicity and a molecular weight comparable to quinine and which is capable of displacing the vitamin from the fuller's earth.

11. The method of obtaining the antineuritic vitamin from natural sources in concentrated form, which comprises adsorbing the vitamin from a weak extract thereof upon fuller's earth, and then extracting the vitamin from the fuller's earth by means of an acid solution containing an excess of a salt of a strong organic polynitrogenous base which is strongly adsorbed by the fuller's earth and capable of replacing the vitamin adsorbed thereby.

12. The method of obtaining the antineuritic vitamin from natural sources in concentrated form, which comprises adsorbing the vitamin from a weak extract thereof upon fuller's earth, and then extracting the vitamin from the fuller's earth by means of an acid solution of a compound from the group consisting of salts of the polynitrogenous alkaloids, the basic dyes and salts of the guanidines.

13. The method of obtaining the antineuritic vitamin from natural sources in concentrated form, which comprises adsorbing the vitamin from a weak extract thereof upon fuller's earth, and then extracting the vitamin from the fuller's earth by means of an acid solution of a salt of quinine.

14. The method of obtaining the antineuritic vitamin from natural sources in concentrated form, which comprises adsorbing the vitamin from a weak extract thereof upon fuller's earth, and then extracting the vitamin from the fuller's earth by means of an acid solution of Bismarck brown.

15. The method of obtaining the antineuritic vitamin from natural sources in concentrated form, which comprises adsorbing the vitamin from a weak extract thereof upon fuller's earth, and then extracting the vitamin from the fuller's earth by means of an acid solution of a salt of guanidine.

16. The process of obtaining the antineuritic vitamin in concentrated form, which comprises adsorbing the vitamin upon fuller's earth and then treating the fuller's earth with an acid solution of a salt of a polyacid nitrogenous base which is strongly adsorbed by the fuller's earth.

17. The process of obtaining the antineuritic vitamin in concentrated form, which comprises adsorbing the vitamin upon fuller's earth and then treating the fuller's earth with an acid solution of a salt of a polyamino compound which is strongly adsorbed by the fuller's earth.

18. The process of obtaining the antineuritic vitamin in concentrated form, which comprises adsorbing the vitamin from a weak extract thereof upon particles of a strongly adsorbent inorganic material, and then treating the particles with an acid solution of a salt of a strong polynitrogenous base capable of displacing the vitamin from the particles.

ROBERT R. WILLIAMS.
ROBERT E. WATERMAN.